(Model.)  2 Sheets—Sheet 1.
T. L. REED.
MEANS FOR DETACHING AND CONTROLLING LIFE BUOYS.
No. 393,122. Patented Nov. 20, 1888.
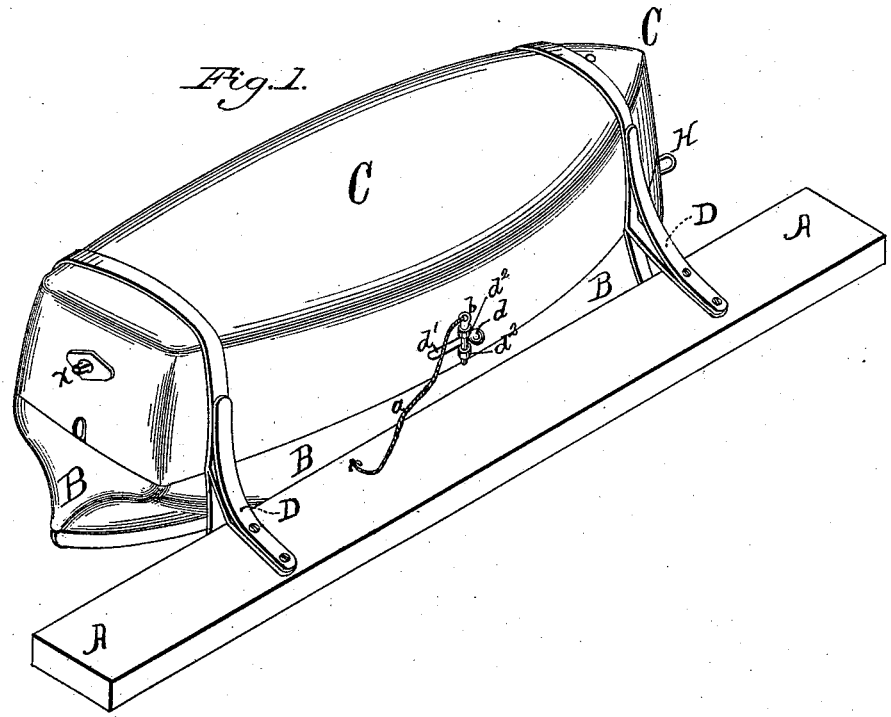
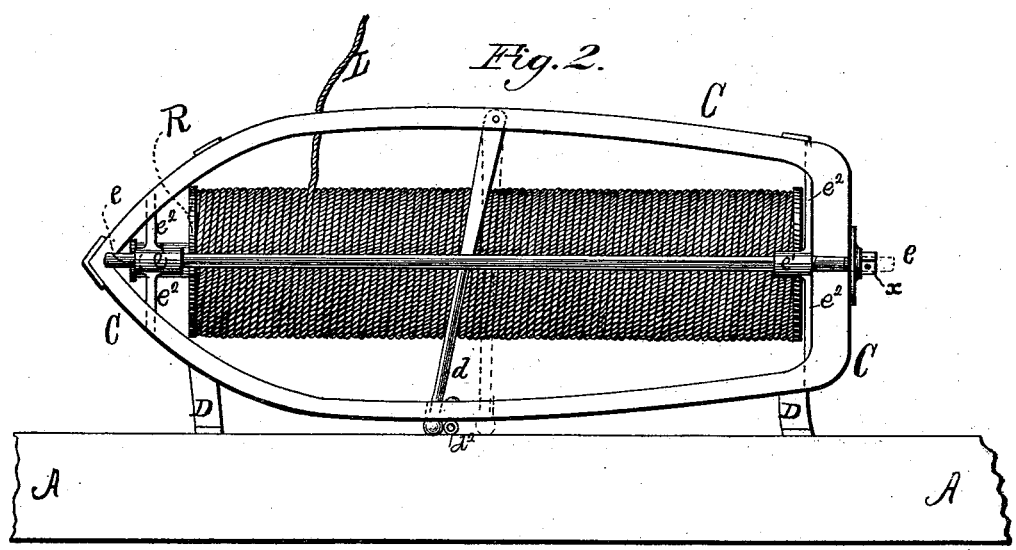
Witnesses:
W. H. Gallagher
D. R. Plontz
Inventor:
Thomas L. Reed

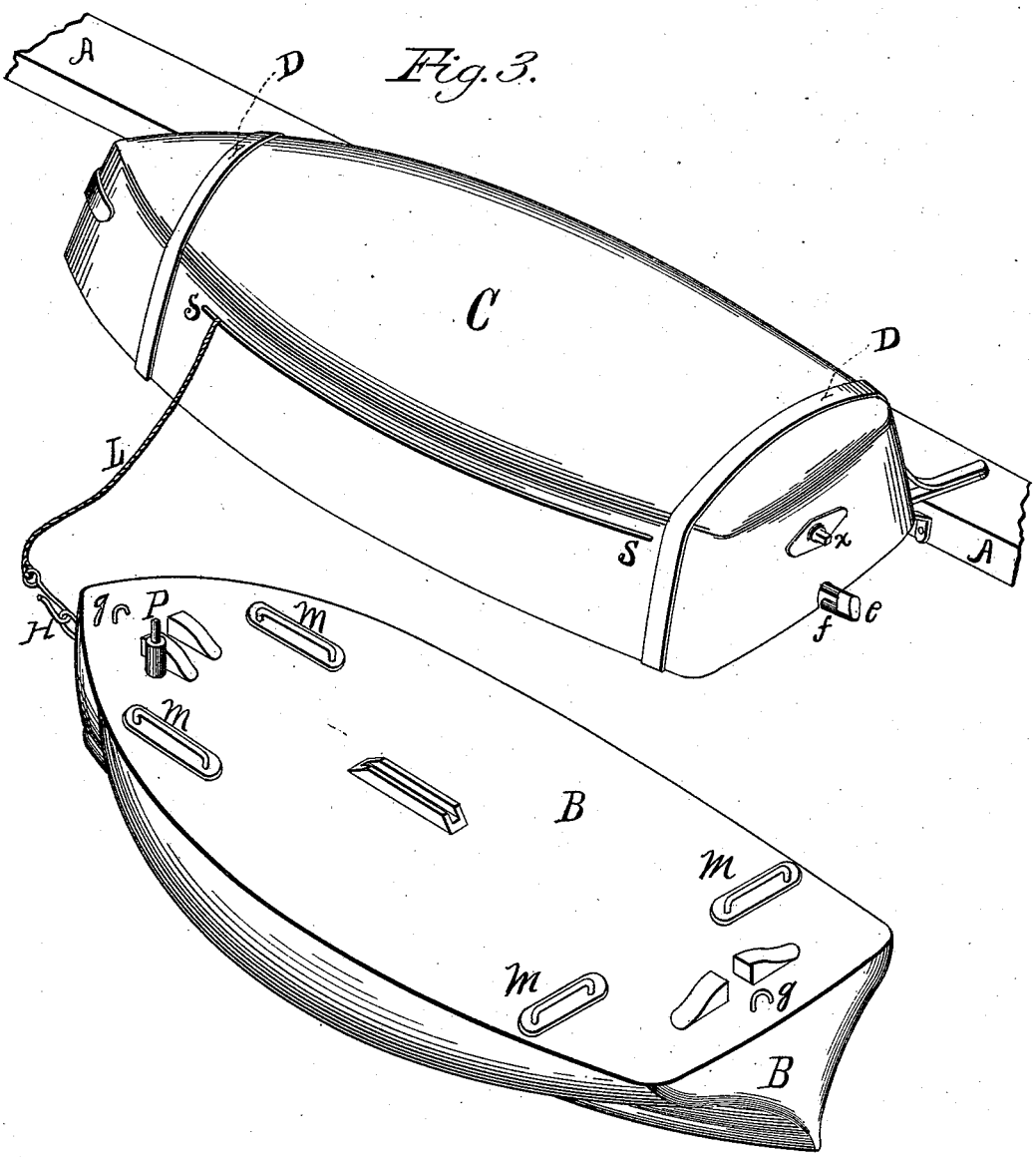

UNITED STATES PATENT OFFICE.

THOMAS L. REED, OF LAPORTE CITY, IOWA, ASSIGNOR OF ONE-HALF TO ALBERT U. EVARTS AND MELFORD L. CUMMINS, OF SAME PLACE.

MEANS FOR DETACHING AND CONTROLLING LIFE-BUOYS.

SPECIFICATION forming part of Letters Patent No. 393,122, dated November 20, 1888.

Application filed January 18, 1888. Serial No. 261,158. (Model.)

*To all whom it may concern:*

Be it known that I, THOMAS L. REED, a citizen of the United States, residing at Laporte City, in the county of Black Hawk and State of Iowa, have invented certain new and useful Improvements in Life-Saving Apparatus; and I do hereby declare the following to be a full, clear, and exact specification, reference being had to the accompanying drawings, in which—

Figure 1 is a perspective view of my improved life-saving apparatus in its closed position. Fig. 2 is a view looking upward from the under side of the apparatus with the boat detached or displaced; and Fig. 3 is a perspective view of the apparatus, showing the boat in its lowest position.

This invention contemplates certain improvements in life-saving apparatus, having for its object to provide convenience and reliability in effecting the rescue of life from drowning, to maintain continuously a connection between the vessel and the rescuing float, and to effect communication between the vessel and shore; and to these ends the nature of the invention consists of apparatus whereby the rescuing medium or float is readily detachable from the vessel or a fixture thereof; of the combination, with the rescuing-float, of a cover or support secured or applied to the vessel and containing a reel, the line or rope from which passes or extends through an elongated slot in the side of the cover or support, and is connected to the rescuing-float, and in certain other details of construction, substantially as hereinafter more fully set forth and claimed.

In carrying out my invention, I secure to the taffrail A of a vessel, preferably by metallic straps or braces D D, a cover or support, C, which is of an approximate inverted-boat shape. Within the cover or support C is arranged a reel, R, upon which is wound the line or rope L, ranging longitudinally thereof, and having one end of its shaft projecting, as at $x$, from the end of the cover or support C, which is adapted to permit of the application thereto of a suitable implement for the manipulation or turning of the reel to effect the rewinding of the previously unwound portion of the line or rope. The free end of the line or rope L is passed or extended through a slot, S S, in the cover or support C, and connected by a hook and staple, H, with the rescuing medium or float B.

A rod, $e\ e$, is seated in tubular sleeves or bearings $e'\ e'$, of brackets $e^2\ e^2$, secured in the cover or support C at its ends, which rod is adapted to have a longitudinal sliding movement in said sleeves or bearings, the purpose of which will appear further on. The rod $e\ e$ has one end arranged in a recess in the lower edge of one end of the cover or support C, and provided or formed with a hook, $f$, which takes into or engages with a staple or eye, $g$, at one end of the float B, while the opposite end of the rod $e\ e$ takes into or engages with a staple or eye, $g$, at the other end of the float B, thus effecting a connection between the cover or support and the float, and supporting it at a point where it can be readily and quickly dropped into the water.

$d$ is a lever which is pivoted at one end in one side of the cover or support C, and is passed between cleats upon the rod $e\ e$ to permit it to actuate or move said rod. The lever $d$ is passed at its other end through a slot, $d'$, in the opposite side of the cover or support C, and is provided outside of said slot with a knob or ball for its convenient manipulation.

Upon the outside of the cover or support C are applied or secured two eyes, $d^2\ d^2$, arranged one above and one below the slot $d'$ intermediately of the ends of the slot, and are adapted to receive a pin, $b$, connected by a cord, $a$, to the taffrail A of the vessel. The float B is provided with hand-holds $m\ m$, to permit of the ready grasping of the same by the one in the water.

In the event of an occasion arising for the use of the apparatus—*i. e.*, the falling overboard of a person—the cord $a$ of the pin $b$ is grasped or pulled, so as to effect the withdrawal of the pin from the eyes $d^2\ d^2$. The lever $d$, which previously had been moved to the full-lined position, Fig. 2, is now moved to the dotted-line position, which effects the endwise or longitudinal movement of the rod $e\ e$, withdrawing its one end and hook $f$ from the eyes $g\ g$ of the float B, instantly allowing the float to fall to the water, the line or rope L rapidly unwinding from the reel R with the descent of the float. The line or rope L continuing to unwind from the reel, as it does, the float B will not be drawn or towed by the vessel from which it has, as above intimated, been dropped, and thus give the person overboard ample time to reach the float before the whole of the rope or line has been paid out. As he reaches the float, and by laying hold upon or grasping a hand-hold, m, he is enabled to secure himself thereto. The reel is now turned so as to rewind the paid-out portion of the line or rope, which will accordingly draw the float with the person to the vessel and thus effect his rescue from drowning. In order to aid in finding the float, should darkness intervene, a torch or port-fire, P, Fig. 3, is employed, so as to be readily seen. It may be ignited by means of a gun-lock percussion-cap and a tube filled or supplied with powder, which would throw a stream of fire directly upon the torch or port-fire. The lock may be sprung by a rod connecting a trigger with the lever d, which effects the detachment of the float, thus simultaneously therewith regulating the firing of the torch or port-fire.

It is obvious that the rescuing capacity of the apparatus can be increased by increasing the size of the float to buoy up several persons at the same time.

Having thus fully described my invention, what I claim, and desire to secure by Letters Patent, is—

1. In a life-saving apparatus, the combination of the slotted cover applied to a vessel and the reel disposed in said cover, of which the line or rope passes through the slot of said cover for connection with a life-buoy, substantially as set forth.

2. The combination of the float having eyes, one at each end, with the cover or support applied to the taffrail of a vessel and provided with an endwise-movable rod having a hook at one end, the lever actuating said rod and extending through a slot in said cover or support, the eyes arranged upon the outside of the cover or support and one on each side of said slot, and the pin passed through said eyes, substantially as set forth.

3. The life-saving apparatus consisting of the cover or support containing the reel, with its line or rope passed through a slot in said cover or support, the longitudinally-movable rod supported in sleeves of brackets fastened to said cover or support, said rod having a hook at one end, the lever actuating said rod and passed through a slot in said cover or support, eyes applied to said cover or support, one at each side of the slot through which passes said lever, the pin passing through said eyes of the cover or support, and the float provided with eyes, one at each end and receiving said rod and its hook and having connected to it said line or rope, substantially as described.

THOMAS L. REED.

Witnesses:
M. L. NEWTON,
E. SIMPSON.